United States Patent [19]

Gimby

[11] Patent Number: 4,938,254
[45] Date of Patent: Jul. 3, 1990

[54] OVER-PRESSURE RELIEF VALVE

[75] Inventor: David R. Gimby, Livonia, Mich.

[73] Assignee: Borg-Warner Automotive Electronic & Mechanical Systems, Troy, Mich.

[21] Appl. No.: 410,568

[22] Filed: Sep. 21, 1989

[51] Int. Cl.$^5$ .............................................. F16K 17/08
[52] U.S. Cl. .................................................... 137/541
[58] Field of Search ........................ 137/541, 542, 588

[56] References Cited

U.S. PATENT DOCUMENTS

| 2,912,002 | 11/1959 | Miller | 137/541 |
| 4,129,144 | 12/1978 | Andersson | 137/541 |
| 4,387,854 | 6/1983 | DuPont | 137/541 X |
| 4,431,023 | 2/1984 | Johnson | 137/541 X |
| 4,834,131 | 5/1989 | Austin | 137/541 X |

FOREIGN PATENT DOCUMENTS 100426  5/1956  Netherlands ....................... 137/541

Primary Examiner—Robert G. Nilson
Attorney, Agent, or Firm—Thomas A. Meehan; Greg Dziegielewski

[57] ABSTRACT

An over-pressure relief valve to be positioned within an opening of a vessel, the relief valve having a valve member with a closed end which is positioned within the opening and which carries an O-ring adjacent to the closed end. The O-ring normally engages the vessel in a circumferential pattern surrounding the opening to seal the opening. The valve member further has a second end within the vessel and the second end is resiliently biased toward the interior of the vessel by a coil spring. The coil spring is trapped between a radial flange of the valve member, which is positioned at the second end thereof, and the inside of the vessel. An over-pressure condition within the vessel overcomes the effect of the coil spring and moves the valve member to break the sealing engagement between the O-ring and the vessel. An initial, limited degree of venting occurs through an annulus which is formed between the opening and the valve member. Further venting occurs, if needed, by way of an internal passage in the valve member which extends from the second end to an opposed pair of radial passages that are positioned entirely within the vessel when the O-ring is in sealing engagement with the vessel.

17 Claims, 1 Drawing Sheet

OVER-PRESSURE RELIEF VALVE

FIELD OF THE INVENTION

This invention relates to an over-pressure relief valve for a vessel which is filled or partly filled with a fluid whose pressure is subject to variation. More particularly, this invention relates to an over pressure relief valve for a vessel which is filled or partly filled with a volatile fuel.

BACKGROUND OF THE INVENTION

Fuel tanks, such as fuel tanks for gasoline powered motor vehicles, and vapor recovery filling systems for such fuel tanks each of which must form a seal between the fuel tank filler tube of the vehicle and the filler nozzle of the filling pump, are subject to over-pressure conditions during refueling due to the occasional failure of the filler nozzle of the filling pump to shut off when the tank has filled. It is desirable to be able to relieve such an over-pressure condition to avoid distortion of the tank or its components which experience the over-pressure condition, and to be able to do so quickly. Heretofore, poppet-type valves have been utilized to relieve an over-pressure condition in a fuel containing vessel, but such valves tend to open too easily or too far, thus permitting venting when it is not required or excessive venting after it is required. Needle-type valves have also been utilized for this purpose, but such valves are subject to misalignment in operation and require a guide or housing of complex construction to prevent such misalignment.

SUMMARY OF THE INVENTION

According to the present invention there is provided a valve for relieving an over-pressure condition in an otherwise closed fuel tank or other vessel, for example, the filler neck of an on-board vapor recovery filler neck module, and of doing so reliably and at a variable rate which is proportional to the magnitude of the over-pressure condition. The valve includes a valve member which is closed at one end and which has an internal passage extending partly from the other end to the closed end. The valve member is movable along its longitudinal central axis and has at least one, and preferably two, openings in its body in communication with the internal passage through which vapors entering the valve body at the open end thereof can exit. The valve body carries an O-ring in a circumferentially extending recess near the closed end of the valve body, and the O-ring normally seats against an annular seating surface at an opening in the fuel tank or other vessel in which the valve is installed, the opening preferably being slightly larger than the portion of the valve body which it surrounds. A spring is trapped between the tank or vessel and a flange near the inlet end of the valve body to bias the valve body toward the interior of the tank or vessel, and thereby tend to keep the O-ring seated against its seating surface. In this position of the valve body the opening or openings of the valve body are positioned within the tank or vessel and there is no flow of fluid from the tank or vessel through the valve.

An over-pressure condition within the tank or vessel will act on the valve member of the present invention to unseat the O-ring from the seat against which it normally seats to permit an initial, limited degree of venting through an annulus defined by the outside of the valve body and the inside of the opening in the vessel. If the over-pressure condition is too severe in magnitude to be properly relieved by this limited degree of venting, the valve member will be further moved to permit additional venting through the interior of the valve member and the opening or openings therein as such opening or openings move beyond the opening in the tank or vessel, and this additional venting will vary in magnitude as a function of the degree of over-pressurization in the tank or vessel. As soon as the over-pressure condition is relieved the spring will move the valve body back toward the interior of the tank or vessel to again seat its O-ring against its seating surface and again close the valve body to flow therethrough or therearound. Because of the internal passage in the valve body, its outside diameter will be sufficiently large to permit it to be substantially self-aligning in its normal operation.

Accordingly, it is an object of the present invention to provide an improved valve for relieving an over-pressure condition in a tank or vessel. More particularly, it is an object of the present invention to provide a valve for relieving an over-pressure condition which remains positively seated in a non-venting position until the over-pressure condition is sufficient in magnitude to require relief. It is a further object of the present invention to provide an over-pressure relief valve that is capable of venting at a variable rate which is a function of the magnitude of the over-pressure condition in the tank or vessel that incorporates such valve. Further, it is an object of the present invention to provide an over-pressure relief valve which is not subject to misalignment problems during its operation.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
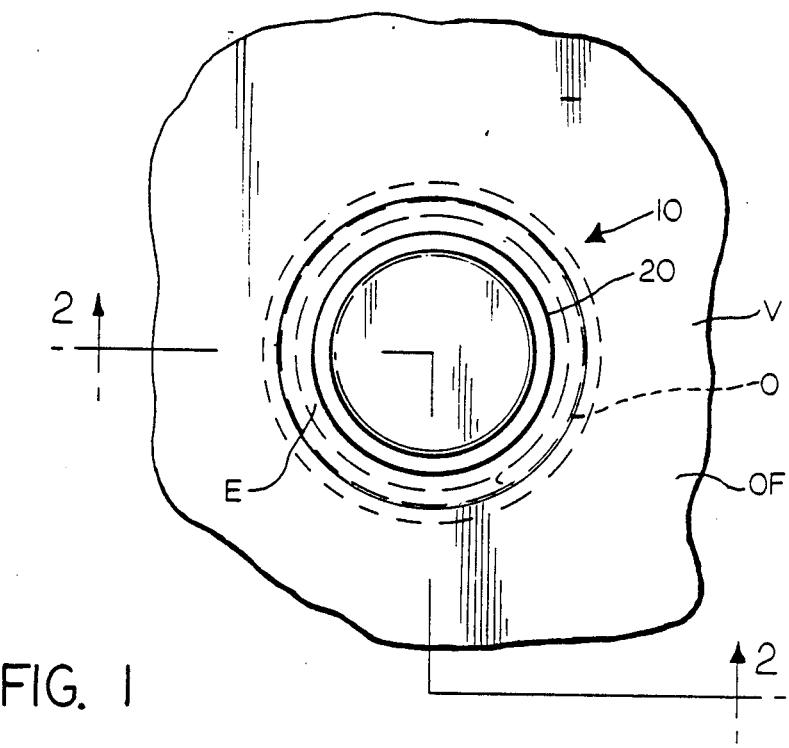
FIG. 1 is a plan view of an over-pressure relief valve according to the preferred embodiment of the present invention.
Figure 2:
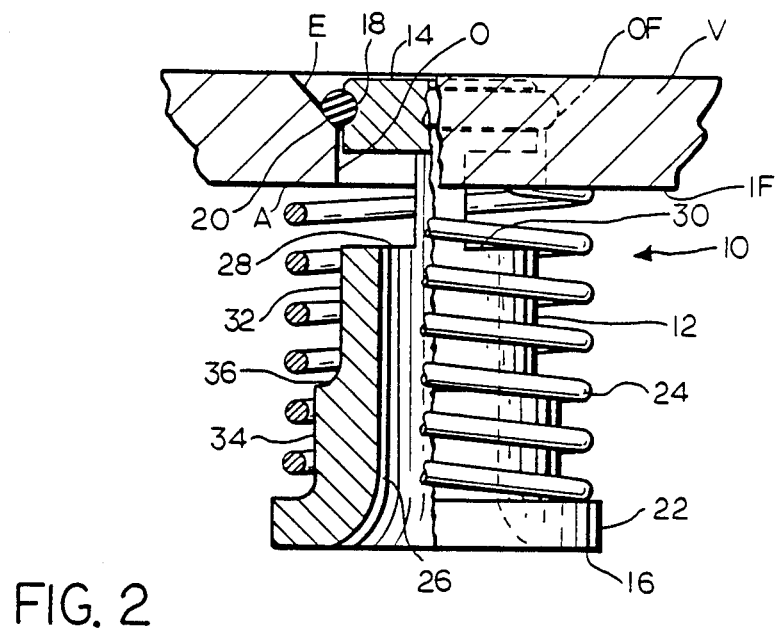
FIG. 2 is a sectional view taken on line 2—2 of FIG. 1.

An over-pressure relief valve according to the preferred embodiment of the present invention is generally identified by the reference numeral 10. The relief valve 10 is designed to be installed in an opening O in a vessel V, shown fragmentarily, for example, a filler neck module for installation in a fuel tank filler tube of a motor vehicle having an on-board vapor recovery fuel filling system. The vessel V has a bevelled edge E surrounding the opening O for purposes which will hereinafter be made clear.

The fuel valve 10 has a valve member 12 which is positioned within the opening O and which is reciprocable within the opening O along the central axis of the opening O. The valve member 12 has a first end 14, which is positioned adjacent to an outside face OF of the vessel V, and a second end 16, which is positioned within the vessel V. The valve member 12 has a part toroidal recess 18 positioned adjacent to the first end thereof, and the valve member 12 carries an elastomeric O-ring 20 which is retained in the recess 18.

The valve member 12 has an outwardly projecting circumferential flange 22 at its second end 16, and the valve member 12 is resiliently biased toward the interior of the vessel V, to bring the O-ring 20 into sealing engagement with the vessel V, specifically the bevelled edge E which surrounds the opening 0, by a metallic coil spring 24 which is compressively trapped between the flange 22 and an inside face IF of the vessel V.

The first end 14 of the valve member 12 is closed to flow, but the valve member 12 has an internal passage 26 which extends from the second end 16 thereof to an opposed pair of radial openings 28 and 30 in the valve member 12. The openings 28 and 30 of the valve member 12 are generally rectangular in configuration and are positioned between the first end 14 and the second end 16 thereof and entirely within the portion of the vessel V which is sealed by the O-ring 20 when the O-ring 20 is seated against the bevelled edge E. Thus, there is no venting or other leakage of any fluid within the vessel V through the over-pressure valve 10 when the O-ring is seated against the bevelled edge E.

An over-pressure condition within the vessel V will urge the valve member 12 upwardly, in the orientation of the over-pressure valve 10 which is shown in FIG. 1, against the resilient force of the spring 24 on the flange 22 of the valve member 12, to unseat the O-ring from the bevelled edge E. An initial, limited degree of venting will occur following such unseating through an annulus A which is defined by the inside of the opening 0 of the vessel and a portion of the valve member 12 that is surrounded by the opening O. If this initial, limited degree of venting is sufficient to relieve the over-pressure condition within the vessel V, the spring 24 will return the valve member 12 to its normal, non-venting position, with the O-ring 20 seated against the bevelled edge E.

If the degree of venting through the annulus A is insufficient to relieve the over-pressure condition within the vessel V, such over-pressure condition will continue to urge the valve member 12 upwardly until the tops of the openings 28 and 30 clear the portion of the opening O in the vessel V which is below the bevelled portion B thereof. At this position of the valve member 12 an additional or secondary venting of the vessel will begin to occur, upwardly through the internal passage 26 and outwardly through the openings 28 and 30. The rate of this venting will be a function of the degree to which the openings 26 and 28 have cleared the opening O in the vessel V, and, in turn, this will be a function of the degree of over-pressurization within the vessel V. Thus, the relief valve 10 functions to vent an over-pressure condition within the vessel V at a rate which is a function of the degree of such over-pressure condition, at least until the openings 26 and 28 in the valve member 12 have entirely cleared the opening O in the vessel V.

The portion of the valve member 12 from the top of the flange 22 to the bottoms of the openings 28 and 30, which is identified by reference numeral 32 in the drawing, is slightly smaller than the portion thereabove, which is identified by the reference numeral 34 in the drawing, that is, in a valve member 12 which is circular in cross-section, the portion 32 has a smaller diameter than the portion 34. Thus, a transversely extending annular shoulder 36 is formed at the juncture of the portion 32 and the portion 34. The opening O in the vessel V, while larger than the portion 32, is smaller than the portion 34 and the shoulder 36. Thus, the shoulder 36 will serve as a stop surface to limit the travel of the valve member 12 when the shoulder 36 abuts the inside face IF of the valve V. The diameter of the portion 34 is such that it fits snugly within the portion of the spring 24 that surrounds it to center the valve member 12 and the spring 24 relative to one another and to ensure that the axes of the valve member 12 and the opening O of the vessel V are always in alignment. The coil spring 24 preferably has closed ends for the same purpose.

In the preferred embodiment of the present invention, in which the relief valve 10 is used to relieve an over-pressure condition in the filler neck of an on-board vapor recovery filler neck module of a motor vehicle, the valve member 12, which is approximately 13.5 millimeters in maximum diameter, at the outside diameter of the flange 22, and which is approximately 13.6 millimeters in axial length, is manufactured from an acetal homopolymer by injection molding; the O-ring 20, which has a wire diameter of approximately 1.78 millimeters, is formed from a flurocarbon 50 elastomeric material by Goshen Rubber; and the coil spring 24 is formed from type 302 stainless steel with a wire diameter of O.4572 millimeters, and a spring rate of approximately 0.064 N/mm.

Such a spring will keep the O-ring 20 of a relief valve 10, as heretofore described, firmly seated against the bevelled edge E of the opening O until an over-pressure condition of sufficient magnitude to require venting has developed within the vessel V.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A relief valve for installation in an opening of a vessel which is subject to an over-pressure condition, the vessel having an inside face and an outside face, said relief valve comprising:

a valve member having a closed first end and a second end, said first end being adapted to be positioned within the opening of the vessel;

means carrier by said valve member for forming a seal with the opening of the vessel;

resilient biasing means acting on said valve member for normally maintaining said means carried by said valve member in sealing engagement with the opening of the vessel, an over-pressure condition within the vessel overcoming the effect of said resilient biasing means to permit venting of the vessel;

wherein the opening in the vessel is larger than a portion of said valve member which is adjacent to said first end, the opening forming an annulus with said portion, the venting of the vessel occurring at least in part through the annulus; and wherein said valve member further comprises an internal passage extending from said second end partly to said first end, and radially extending passage means within said valve member in communication with said internal passage, said radially extending passage means being adapted to be entirely within the vessel when said means carried by said valve member is in sealing engagement with the vessel, said radially extending passage means being adapted to extend at least partly beyond the outside face of the vessel during an over-pressure condition within the vessel to provide additional venting of the vessel through said internal passage and said radially extending passage means.

2. A relief valve according to claim 1 wherein said valve member further comprises a second portion extending from a position adjacent to said second end to said portion, said second portion being larger than said portion and the opening of the vessel and limiting the travel of said valve member within the opening.

3. A relief valve according to claim 1 wherein said radially extending passage means comprises a circumferentially spaced apart plurality of radial passages.

4. A relief valve according to claim 3 wherein said plurality of radial passages consists of two opposed radial passages.

5. A relief valve according to claim 1 wherein said valve member further comprises a circumferential recess adjacent to said first end, and wherein said means carried by said valve member comprises an elastomeric O-ring within said recess.

6. A relief valve according to claim 1 wherein said valve member comprises a radially extending flange positioned adjacent to said second end, and wherein said resilient biasing means comprises a coil spring which is adapted to be trapped between said radially extending flange and the inside face of the vessel.

7. A relief valve according to claim 6 wherein said valve member further comprises a second position extending from a position adjacent to said second end to said portion, said second portion being larger than said portion, and wherein said coil spring snugly surrounds said second portion to help center said valve member in the opening.

8. A relief valve according to claim 7 wherein said coil spring has closed ends.

9. In combination with a vessel having an opening and an inside face and an outside face, a relief valve positioned within said opening for relieving an over-pressure condition within said vessel, said relief valve comprising:
 a valve member having a closed first end and an open second end, said first end being position within said opening of said vessel;
 means carried by said valve member for forming a seal with said opening of said vessel; and
 resilient biasing means acting on said valve member for normally maintaining said means with said opening of said vessel, an over-pressure condition within said vessel overcoming the effect of said resilient biasing means to permit venting of said vessel;
 wherein said opening in said vessel is larger than a portion of said valve member which is adjacent to said first end, said opening forming an annulus with said portion, the venting of said vessel occurring at least in part through said annulus; and
 wherein said valve member further comprises an internal passage extending from said second end partly to said first end, and radially extending passage means within said valve member in communication with said internal passage, said radially extending passage means being entirely within said vessel when said means carried by said valve member is in sealing engagement with said vessel, said radially extending passage means being adapted to extend at least partly beyond said outside face of said vessel during an over-pressure condition within said vessel to provide additional venting of said vessel through said internal passage and said radially extending passage means.

10. A combination according to claim 9 wherein said valve member further comprises a second portion extending from a position adjacent to said second end to said portion, said second portion being larger than said portion and said opening of said vessel and limiting the travel of said valve member within said opening.

11. A combination according to claim 9 wherein said radially extending passage means comprises a circumferentially spaced apart plurality of radial passages.

12. A combination according to claim 11 wherein said plurality of radial passages consists of two opposed radial passages.

13. A combination according to claim 9 wherein said valve member further comprises a circumferential recess adjacent to said first end, and wherein said means carried by said valve member comprises an elastomeric O-ring within said recess.

14. A combination according to claim 13 wherein said outside face of said vessel has a bevelled edge surrounding said opening, and wherein said O-ring normally is in sealing engagement with said bevelled edge.

15. A combination according to claim 9 wherein said valve member comprises a radially extending flange positioned adjacent to said second end, and wherein said resilient biasing means comprises a coil spring which is trapped between said radially extending flange and said inside face of said vessel.

16. A combination according to claim 15 wherein said valve member further comprises a second portion extending from a position adjacent to said second end to said portion, said second portion being larger than said portion, and wherein said coil spring snugly surrounds said second portion to help center said valve member in said opening.

17. A combination according to claim 16 wherein said coil spring has closed ends.

* * * * *